(12) United States Patent
Matsubara et al.

(10) Patent No.: US 8,018,119 B2
(45) Date of Patent: Sep. 13, 2011

(54) ELECTROSTATIC INDUCTION POWER GENERATOR

(75) Inventors: Naoteru Matsubara, Ichinomiya (JP); Makoto Izumi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 208 days.

(21) Appl. No.: 12/538,483

(22) Filed: Aug. 10, 2009

(65) Prior Publication Data
US 2010/0072855 A1  Mar. 25, 2010

(30) Foreign Application Priority Data
Sep. 25, 2008  (JP) .................................. 2008-246826

(51) Int. Cl.
*H02N 1/00*  (2006.01)
(52) U.S. Cl. ...................................................... 310/309
(58) Field of Classification Search .................. 310/309; 322/2 A; 290/1 R
See application file for complete search history.

(56) References Cited

U.S. PATENT DOCUMENTS

| 4,897,592 | A * | 1/1990 | Hyde | 322/2 A |
| 7,166,951 | B2 * | 1/2007 | Koga et al. | 310/309 |
| 7,649,302 | B2 * | 1/2010 | Murayama et al. | 310/309 |
| 7,851,967 | B2 * | 12/2010 | Matsubara et al. | 310/309 |
| 2005/0253481 | A1 * | 11/2005 | Koga et al. | 310/309 |
| 2006/0226733 | A1 * | 10/2006 | Min et al. | 310/309 |
| 2008/0048521 | A1 * | 2/2008 | Mabuchi et al. | 310/309 |
| 2008/0122313 | A1 * | 5/2008 | Mabuchi et al. | 310/309 |
| 2009/0058224 | A1 * | 3/2009 | Murayama et al. | 310/309 |

FOREIGN PATENT DOCUMENTS

JP  2005529574 A  9/2005
WO  03105167 A2  12/2003

* cited by examiner

*Primary Examiner* — Thanh Lam
(74) *Attorney, Agent, or Firm* — Dittavong Mori & Steiner, P.C.

(57) ABSTRACT

An electrostatic induction power generator includes first and second substrates arranged to be opposed to each other, a third substrate arranged between the first and second substrates, first and second electrodes provided on both surfaces of the third substrate respectively, a third electrode provided on a surface of the first substrate; and a fourth electrode provided on a surface of the second substrate.

20 Claims, 7 Drawing Sheets

FIRST EMBODIMENT

FIRST EMBODIMENT

COMPARATIVE EXAMPLE

COMPARATIVE EXAMPLE

ELECTROSTATIC INDUCTION POWER GENERATOR

CROSS-REFERENCE TO RELATED APPLICATIONS

The priority application number JP2008-246826, Electrostatic Induction Power Generator, Sep. 25, 2008, Naoteru Matsubara, Makoto Izumi, upon which this patent application is based is hereby incorporated by reference.

BACKGROUND OF THE INVENTION

1. Field of the Invention

The present invention relates to an electrostatic induction power generator, and more particularly, it relates to an electrostatic induction power generator comprising a plurality of electrodes.

2. Description of the Background Art

An electrostatic induction power generator comprising a plurality of electrodes is known in general.

A conventional electrostatic induction power generator comprises a collector provided on one of a pair of substrates and an electret film (electrode) provided on the other substrate. Charges different in polarity from charges stored in the electret film are induced in the collector by electrostatic induction. The quantity of charges induced in the collector is changed by relative movement of the pair of substrates (the collector and the electret film), and the changed charges induced in the collector flows to an external circuit as a current, thereby extracting electric energy.

SUMMARY OF THE INVENTION

An electrostatic induction power generator according to an aspect of the present invention comprises first and second substrates arranged to be opposed to each other, a third substrate arranged between the first and second substrates to be opposed to the first and second substrates, first and second electrodes provided on both surfaces of the third substrate respectively, a third electrode provided on a surface of the first substrate and a fourth electrode provided on a surface of the second substrate, wherein power is generated by electrostatic induction caused by relative movement of the first and second substrates and the third substrate.

According to the aforementioned structure, the quantity of power generated in the electrostatic induction power generator can be inhibited from reduction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described with reference to the drawings.

First Embodiment

Figure 2:
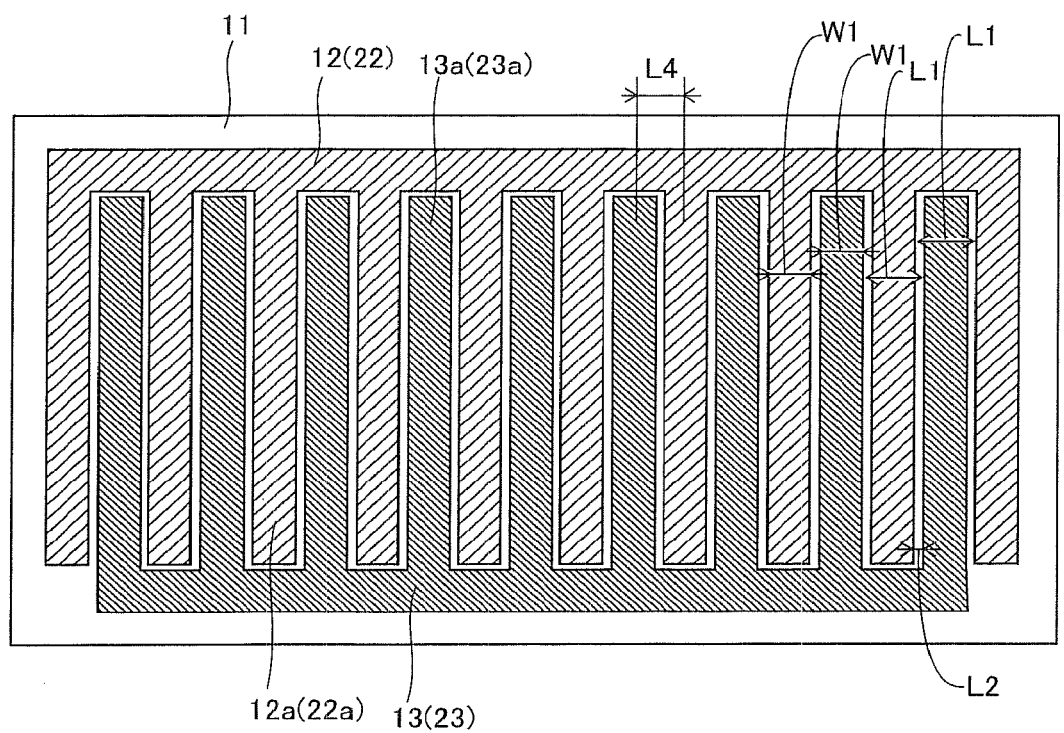
FIG. 2 is a sectional view taken along the line 200-200 in FIG. 1.

An electrostatic induction power generator 100 according to a first embodiment is constituted by a fixed substrate 11, a fixed substrate 21, a movable substrate 31, rectifier circuits 43 and 44, a capacitor 45 and a resistance (load) 46. A collector 12 and a collector 13 are formed on a surface of the fixed substrate 11. The fixed substrate 11 is an example of the "second substrate" in the present invention. The collector 12 and the collector 13 are examples of the "fourth electrode" in the present invention. As shown in FIG. 2, the interdigital collector 12 and the interdigital collector 13 are formed by a plurality of electrode portions 12a and a plurality of electrode portions 13a electrically connected each other, respectively. The collector 12 and the collector 13 are so arranged that the teeth 13a forming the interdigital collector 13 are arranged between the teeth 12a forming the interdigital collector 12. The teeth 12a and 13a are examples of the "electrode portion" in the present invention. The rectifier circuits 43 and 44 are examples of the "first rectifier circuit" and the "second rectifier circuit" in the present invention, respectively.

A width W1 of the teeth 12a (teeth 13a) forming the interdigital collector 12 (collector 13) is about 200 μm. The width W1 of the teeth 12a (teeth 13a) forming the interdigital collector 12 (collector 13) may be at least about 5 μm and not more than about 500 μm.

An interval L1 between the teeth 12a (teeth 13a) forming the interdigital collector 12 (collector 13) is about 230 μm. The interval L1 between the teeth 12a (teeth 13a) forming the interdigital collector 12 (collector 13) may be at least about 10 μm and not more than about 500 μm.

An Interval L2 between the teeth 12a forming the interdigital collector 12 and the teeth 13a forming the interdigital collector 13 is about 30 μm. The interval L2 between the teeth 12a forming the interdigital collector 12 and the teeth 13a forming the interdigital collector 13 may be at least about 5 μm and not more than about 50 μm.

A collector 22 and a collector 23 are formed on a surface of the fixed substrate 21. The fixed substrate 21 is an example of the "first substrate" in the present invention. The collector 22 and the collector 23 are examples of the "third electrode" in the present invention. The interdigital collector 22 and the interdigital collector 23 are formed by a plurality of electrode portions 22a and a plurality of electrode portions 23a electrically connected each other, respectively, similarly to the collectors 12 and 13 shown in FIG. 2. The width W1 of the teeth 22a (teeth 23a) forming the interdigital collector 22 (collector 23), the distance L1 of the teeth 22a (teeth 23a), and the interval L2 between the teeth 22a and the teeth 23a are similar to those of the aforementioned collectors 12 and 13. The teeth 22a and 23a are example of the "electrode portion" in the present invention.

Figure 3:
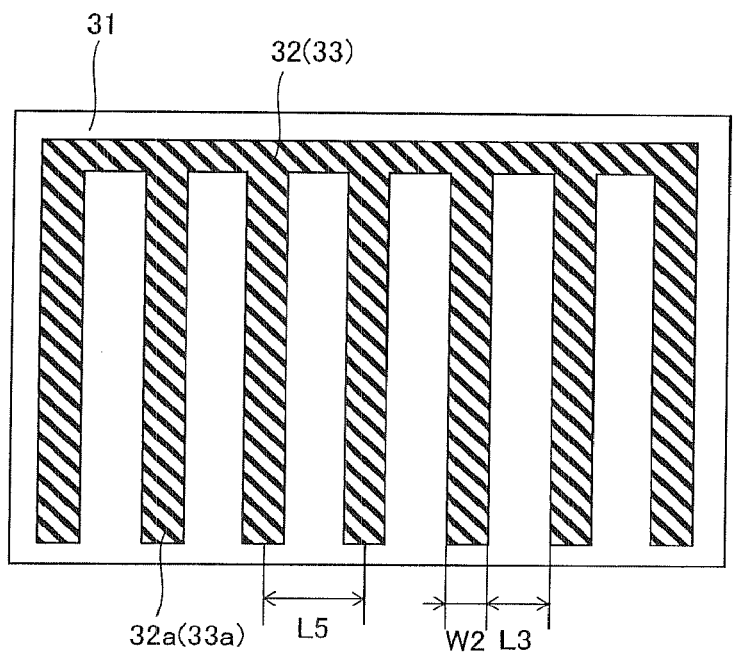
FIG. 3 is a sectional view taken along the line 300-300 in FIG. 1.

The movable substrate 31 is so arranged between the fixed substrate 11 and the fixed substrate 21 that the fixed substrate 11 and the fixed substrate 21 are opposed to each other. The movable substrate 31 is an example of the "third substrate" in the present invention. Electret films 32 and 33 are formed on both surfaces of the movable substrate 31. The electret films 32 and 33 are examples of the "second electrode" and the "first electrode" in the present invention respectively. The electret films 32 and 33 are made of fluororesin such as polytetrafluoroethylene (PTFE) or silicon oxide, and positive or negative charges are injected into the electret films 32 and 33 by corona discharge. Charges of the same polarity or charges of reversed polarity may be injected into the electret films 32 and 33. The electret films 32 and 33 are interdigitally formed as shown in FIG. 3. Widths W2 of teeth 32a and 33a forming the interdigital electret films 32 and 33 are about 230 μm. The widths W2 of the teeth 32a and 33a forming the interdigital electret films 32 and 33 may be at least about 10 μm and not more than about 500 μm.

Intervals L3 between the teeth 32a and 33a forming the interdigital electret films 32 and 33 are about 230 μm. The intervals L3 between the teeth 32a and 33a forming the interdigital electret films 32 and 33 may be at least about 10 μm and not more than about 500 μm.

As hereinabove described, the two collectors 12 and 13 (collectors 22 and 23) are formed on the surface of the fixed substrate 11 (fixed substrate 21), so that the quantity of power generated in the electrostatic induction power generator 100 can be increased as compared with a case of providing a single collector. The electret films 32 and 33 are formed on the both surfaces of the movable substrate 31, so that the quantity of power generated in the electrostatic induction power generator 100 can be increased as compared with a case where the electret film is formed only on one of the surfaces of the movable substrate 31.

An average pitch L4 (see FIG. 2) at which the teeth 12a forming the interdigital collector 12 and the teeth 13a forming the interdigital collector 13 are arranged is about 230 μm, and an average pitch L5 (see FIG. 3) between the teeth 32a (teeth 33a) forming the interdigital electret film 32 (electret film 33) is about 460 μm. In other words, the pitch L4 between the teeth 12a and the teeth 13a is substantially ½ of the pitch L5 of the teeth 32a (teeth 33a).

Figure 4:
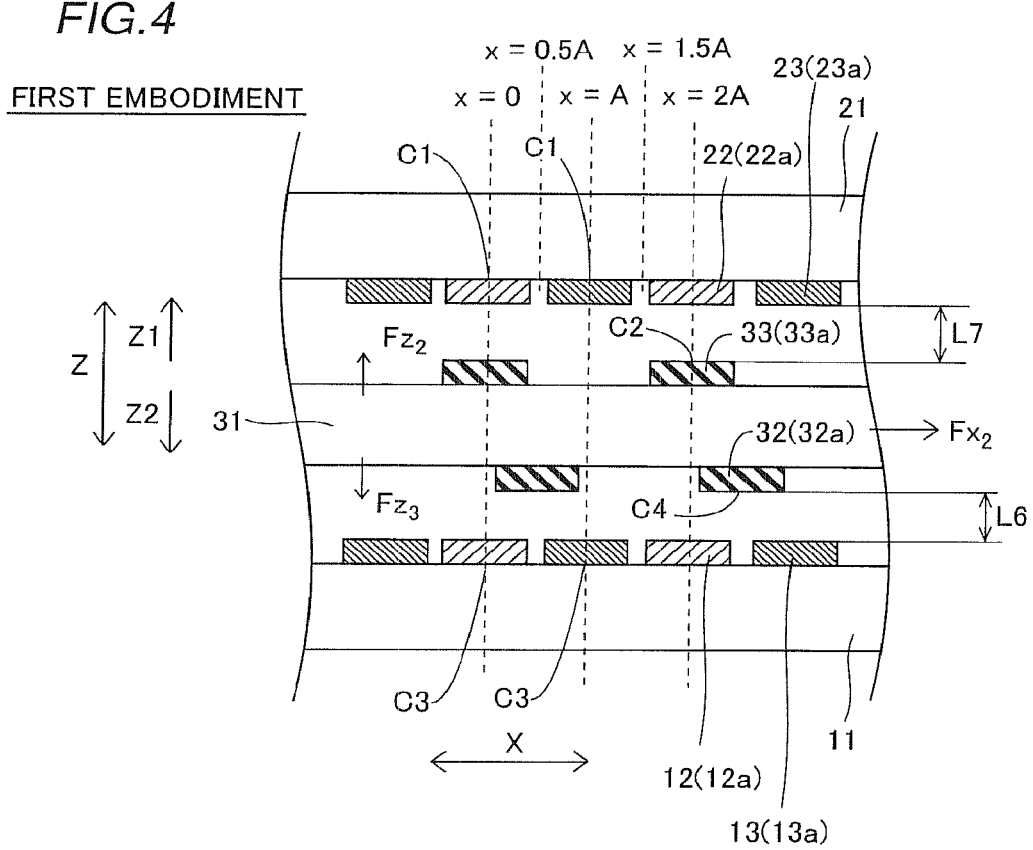
FIG. 4 is an enlarged sectional view of the electrostatic induction power generator according to the first embodiment of the present invention.

An interval L6 between the collectors 12 and 13 and the electret film 32 is about 20 μm, as shown in FIG. 4. The interval L6 between the collectors 12 and 13 and the electret film 32 may be at least about 5 μm and not more than about 50 μm. Similarly, an interval L7 between the collectors 22 and 23 and the electret film 33 is about 20 μm.

As shown in FIG. 4, the electret film 32 and the collector 12 (collector 13) are opposed to each other in a state where the collector 22 (collector 23) and the electret film 33 are opposed to each other. More specifically, the teeth 32a forming the interdigital electret film 32 are arranged to be formed over the teeth 12a forming the interdigital collector 12 and the teeth 13a forming the interdigital collector 13 in plan view in a state where centers C1 in a direction X of the teeth 22a (teeth 23a) forming the interdigital collector 22 (collector 23) and centers C2 in the direction X of the teeth 33a forming the interdigital electret film 33 coincide with each other in plan view. More specifically, centers C4 in the direction X of the teeth 32a forming the interdigital electret film 32 are arranged in the vicinity of central portions of clearances between the teeth 12a forming the interdigital collector 12 and the teeth 13a forming the interdigital collector 13 in plan view.

The electret film 33 and the electret film 32 are opposed to the collector 22 (collector 23) and the collector 12 (collector 13) respectively in a state where the centers C2 in the direction X of the teeth 33a forming the interdigital electret film 33 and the centers C4 in the direction X of the teeth 32a forming the interdigital electret film 32 deviate from each other.

Similarly, the teeth 33a forming the interdigital electret film 33 are so arranged as to be formed over the teeth 22a forming the interdigital collector 22 and the teeth 23a forming the interdigital collector 23 in plan view in a state where centers C3 in the direction X of the teeth 12a (teeth 13a) forming the interdigital collector 12 (collector 13) and the centers C4 in the direction X of the teeth 32a forming the interdigital electret film 32 coincide with each other in plan view.

Figure 1:
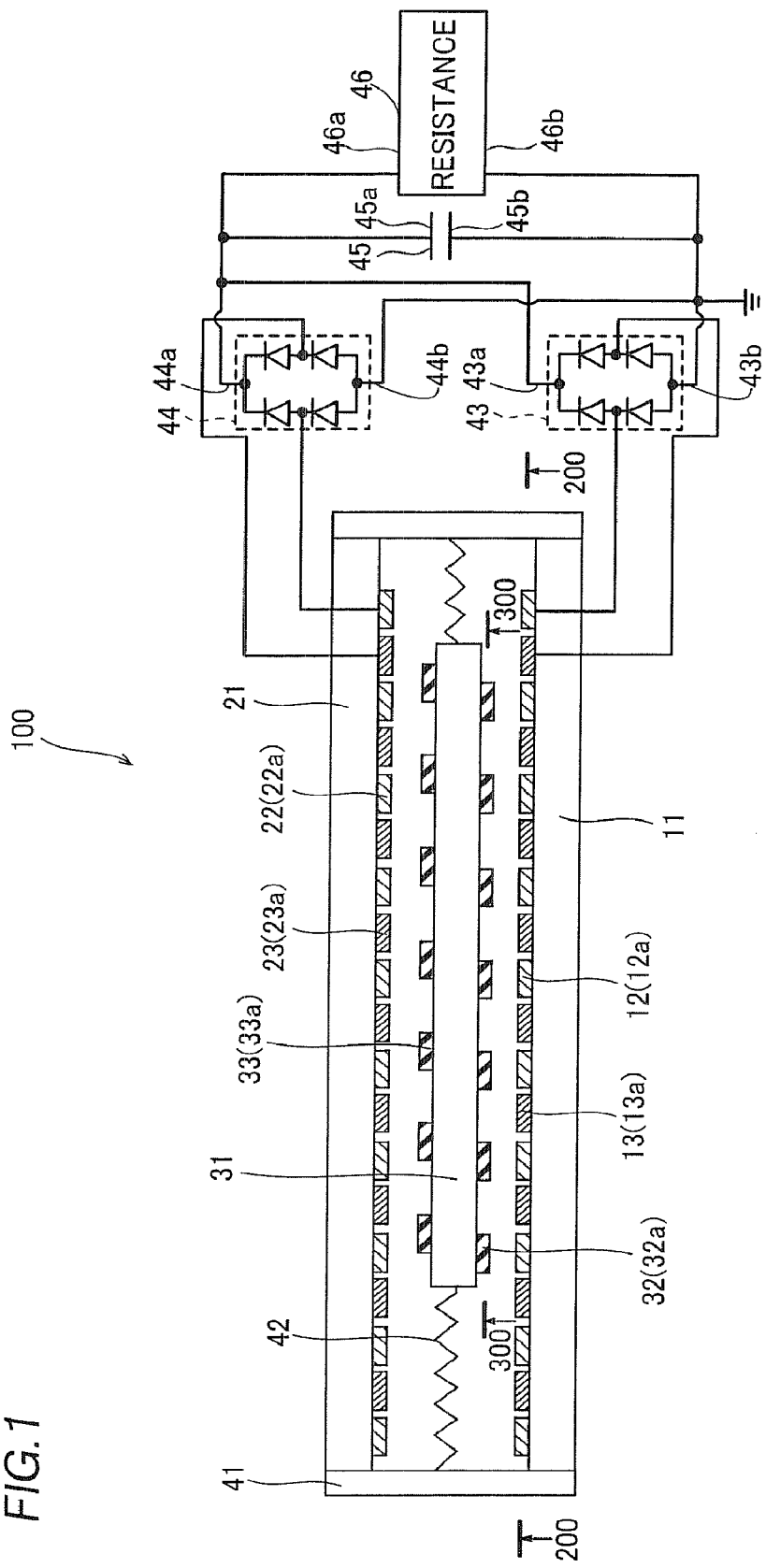
FIG. 1 is a sectional view of an electrostatic induction power generator according to a first embodiment of the present invention.

As shown in FIG. 1, the fixed substrate 11 and the fixed substrate 21 are connected to each other through a column portion 41, and the movable substrate 31 is supported by spring portions 42 connected to the column portion 41.

The collectors 12 and 13 are connected to the rectifier circuit 43 constituted by four diodes. The collectors 22 and 23 are connected to the rectifier circuit 44 constituted by four diodes. An output terminal 43a (44a) of the rectifier circuit 43 (44) is connected to a first end 45a of the capacitor 45 and a first end 46a of the resistance (load) 46. An output terminal 43b (44b) of the rectifier circuit 43 (44) is connected to a second end 45b of the capacitor 45 and a second end 46b of the resistance (load) 46 and is grounded.

Power for driving the electrostatic induction power generator 100 according to the first embodiment of the present invention will be described with reference to FIGS. 4 to 7.

Figure 6:
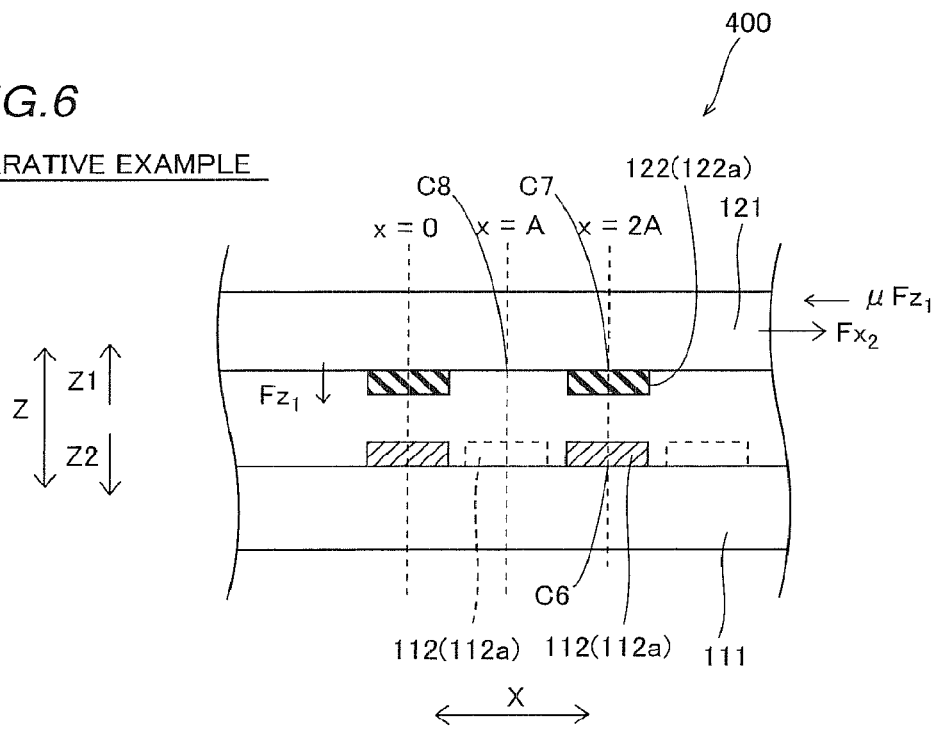
FIG. 6 is a sectional view of an electrostatic induction power generator according to a comparative example.

In an electrostatic induction power generator 400 according to a comparative example, an interdigital collector 112 is formed on a surface of a fixed substrate 111 and an interdigital electret film 122 is formed on a surface of a movable substrate 121, as shown in FIG. 6. Then, the movable substrate 121 is attracted to a side of the fixed substrate 111 (along arrow Z2) by electrostatic force $Fz_1$ acting between charges stored in the electret film 122 and charges induced in a collector 112 by electrostatic induction. Thus, frictional force ($\mu Fz_1$) is caused in the direction X when the movable substrate 121 moves in the direction X, thereby inhibiting movement of the movable substrate 121 and reducing the quantity of power generated in the electrostatic induction power generator 400.

Figure 7:
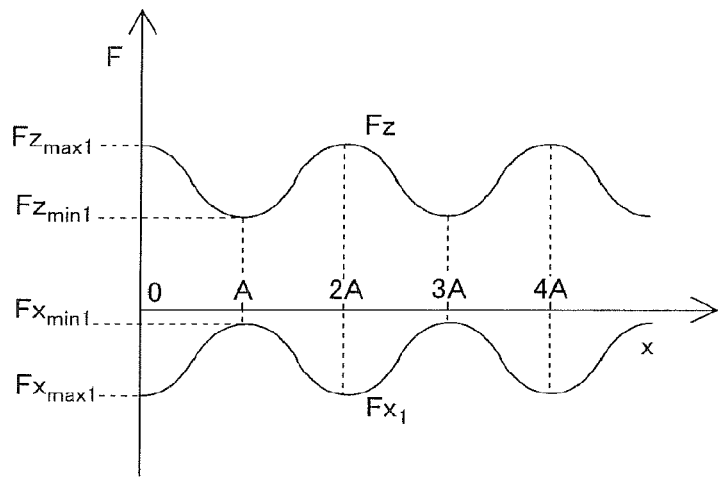
FIG. 7 is a diagram for illustrating power for driving the electrostatic induction power generator according to the comparative example.

The electrostatic force $Fz_1$ is changed following change of an overlapping area of the collector 112 and the electret film 122, and the electrostatic force $Fz_1$ reaches a maximum $Fz_{max1}$ when centers C6 of teeth 112a forming the interdigital collector 112 and centers C7 of teeth 122a forming the interdigital electret film 122 coincide with each other (when x=0, 2A shown in FIG. 6), while the electrostatic force $Fz_1$ reaches a minimum value $Fz_{min1}$ when the centers C6 of the teeth 112a coincide with centers C8 between the teeth 122a coincide (when x=A: collector 112 shown by dotted lines, shown in FIG. 6), as shown in FIG. 7.

According to the comparative example, when force for moving the movable substrate 121 is $Fx_1$, $Fx_1$ is changed following change of an overlapping area of the collector 112 and the electret film 122, and $Fx_1$ reaches a maximum value $Fx_{max1}$ as a absolute value when the centers C6 of the teeth 112a and the centers C7 of the teeth 122a coincide with each other (when x=0, 2A shown in FIG. 6), while the electrostatic force $Fz_1$ reaches a minimum value $Fx_{min1}$ as a absolute value since electrostatic force is extremely small when the centers C6 of the teeth 112a coincide with the center C8 between the teeth 122a (when x=A: collector 112 shown by dotted lines, shown in FIG. 6), as shown in FIG. 7.

In the electrostatic induction power generator 100 according to the first embodiment of the present invention shown in FIG. 4, on the other hand, the electrostatic force $Fz_2$ acting between the collector 22 and the electret film 33 and the electrostatic force $Fz_3$ acting between the collectors 12 and 13 and the electret film 32 are substantially cancelled. Consequently, when the movable substrate 31 moves in the direction X, the frictional force (μFz) caused in a case where friction exists is substantially zero.

Figure 5:
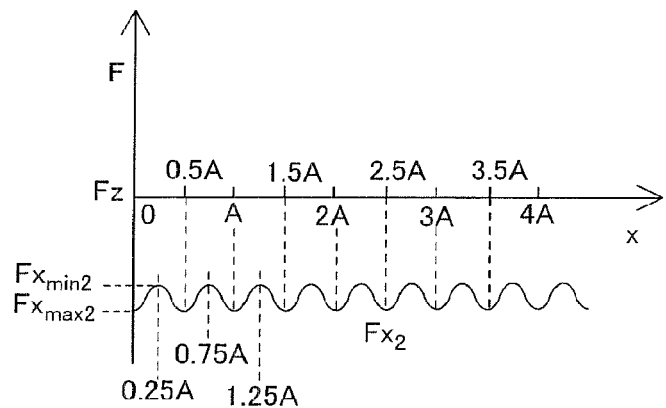
FIG. 5 is a diagram for illustrating power for driving the electrostatic induction power generator according to the first embodiment of the present invention.

Assuming that $Fx_2$ represents force for moving the movable substrate 31, $Fx_2$ reaches a maximum value $Fx_{max2}$ as an absolute value when the centers C1 of the teeth 22a (teeth 23a) and the centers C2 of teeth 33a coincide with each other (when x=0, A, 2A shown in FIG. 4) while $Fx_2$ reaches a maximum value $Fx_{max2}$ as an absolute value when the centers C3 of the teeth 12a (teeth 13a) and the centers C4 of the teeth 32a coincide with each other (when x=0.5 A, 1.5 A, 2.5 A shown in FIG. 4), as shown in FIG. 5.

When the centers of the teeth forming all of the interdigital collectors and the centers of the teeth forming all of the electret films do not coincide with each other, on the other hand, the magnitude of $Fx_2$ is smaller than that of the maximum value $Fx_{max2}$ and $Fx_2$ reaches a minimum value $Fx_{min2}$ as an absolute value on positions of x=0.25 A, 0.75 A, 1.25 A ... shown in FIG. 5.

The magnitude of the force $Fx_2$ ($Fx_{max2}$, $Fx_{min2}$) for moving the movable substrate 31 according to the first embodiment is larger than the absolute value of the $Fx_1$ ($Fx_{max1}$, $Fx_{min1}$) according to the aforementioned comparative example. Difference ($Fx_{max2}-Fx_{min2}$) between the maximum value and the minimum value of the force for moving the movable substrate 31 of the first embodiment is smaller than difference ($Fx_{max1}-Fx_{min1}$) between the maximum value and the minimum value of the comparative example. This is because the electret film 32 (33) and the collectors 12 and 13 (22 and 23) are always opposed to each other and hence electrostatic force always acts between the electret film 32 (33) and the collectors 12 and 13 (22 and 23). According to the comparative example, on the other hand, when the teeth 112a forming the interdigital collector 112 and the teeth 122a forming the interdigital collector 122 are not opposed to each other, electrostatic force is extremely small and hence electrostatic force acting on the movable substrate 121 is changed and the change of the force for moving the movable substrate 121 is increased.

An operation of the electrostatic induction power generator 100 according to the first embodiment of the present invention will be now described with reference to FIG. 1.

When the collectors 12 and 13 (22 and 23) and the electret film 32 (33) are opposed to each other, charges different in polarity from the charges stored in the electret film 32 (33) are induced in the collectors 12 and 13 (22 and 23) by electrostatic induction. Then, the fixed substrate 11 (21) and the movable substrate 31 relatively move, so that the quantities of charges stored in the collectors 12 and 13 (22 and 23) are changed. The quantities of changed charges flow as a current from the collectors 12 and 13 (22 and 23) to the resistance 46 through the rectifier circuit 43 (44), thereby driving the resistance (load such as an electronic apparatus) 46.

According to the first embodiment, as hereinabove described, the electrostatic induction power generator 100 comprises the electret films 32 and 33 provided on the both surfaces of the movable substrate 31 respectively, the collectors 12 and 13 provided on the surfaces of the fixed substrates 11 and 21 respectively and the collectors 22 and 23, whereby the electrostatic force $Fz_3$ acting between the electret film 32 and the collectors 12 and 13 and the electrostatic force $Fz_2$ acting between the electret film 33 and the collectors 22 and 33 are substantially identical in magnitude and reversed in a direction, and hence the electrostatic force in a direction Z for acting on the movable substrate 31 is canceled. Thus, action of frictional force in the direction X is suppressed by the force in the direction Z for acting on the movable substrate 31 inhibits, and hence the quantity of power generated in the electrostatic induction power generator 100 can be inhibited from reduction.

According to the first embodiment, as hereinabove described, the average pitch L4 of the teeth 12a and 13a forming the interdigital collectors 12 and 13 is substantially ½ of the average pitch L5 of the teeth 32a forming the interdigital electret film 32, whereby when one of the teeth 12a and 13a forming the interdigital collectors 12 and 13 and the teeth 32a forming the interdigital electret film 32 are opposed to each other, the other of the teeth 12a and 13a forming the interdigital collectors 12 and 13 and the teeth 32a forming the interdigital electret film 32 can be formed so as not to be opposed to each other. Similarly, the average pitch L4 of the teeth 22a and 23a forming the interdigital collectors 22 and 23 is substantially ½ of the average pitch L5 of the teeth 33a forming the interdigital electret film 33, whereby when one of the teeth 22a and 23a forming the interdigital collectors 22 and 23 and the teeth 33a forming the interdigital electret film 33 are opposed to each other, the other of the teeth 22a and 23a forming the interdigital collectors 22 and 23 and the teeth 33a forming the interdigital electret film 33 can be formed so as not to be opposed to each other.

According to the first embodiment, as hereinabove described, two of the teeth 12a and 13a forming the interdigital collectors 12 and 13 are arranged to be formed over each of the teeth 32a forming the interdigital electret film 32 in plan view when the centers C1 in a width direction of the teeth 22a and 23a forming the interdigital collectors 22 and 23 and the centers C2 in a width direction of the teeth 33a forming the interdigital electret film 33 substantially coincide with each other in plan view, whereby the difference between the maximum value $Fx_{max2}$ and the minimum value $Fx_{min2}$ of the force in the direction X driving the movable substrate 31 can be reduced, and hence power can be stably generated in the electrostatic induction power generator 100. When the difference between the maximum value $Fx_{max2}$ and the minimum value $Fx_{min2}$ of the force in the direction X driving the movable substrate 31 is increased, the movable substrate 31 choppily moves and may not move.

According to the first embodiment, as hereinabove described, the electret film 32 and the collector 12 (collector 13) are opposed to each other in the state where the collector 22 (collector 23) and the electret film 33 are opposed to each other, whereby the electrostatic force between the collector 22 (collector 23) and the electret film 33 and the electrostatic force between the electret film 32 and the collector 12 (collector 13) can be cancelled.

According to the first embodiment, as hereinabove described, the two collectors (collectors 22 and 23) are formed on the surface of the fixed substrate 21 and the two collectors (collectors 12 and 13) are provided on the surface of the fixed substrate 11, whereby change in magnitude of the electrostatic force applied to the movable substrate 31 is reduced during movement of the movable substrate 31 as compared with a case where a single collector is provided on each of the surfaces of the fixed substrates 21 and 11, and hence the movable substrate 31 can be smoothly moved.

According to the first embodiment, as hereinabove described, the interval L6 between the collectors 12 and 13 and the electret film 32 and the interval L7 between the collectors 22 and 23 and the electret film 33 are substantially equal to each other, whereby the electrostatic force between the collectors 12 and 13 and the electret film 32 and the electrostatic force between the collectors 22 and 23 and the electret film 33 can be substantially equal to each other.

According to the first embodiment, as hereinabove described, the collectors 22 and 23 (12 and 13) are connected to the rectifier circuit 44 (43), whereby power is supplied alternately from the collector 22 (12) and the collector 23 (13) to the rectifier circuit 44 (43), and hence the quantity of power generated in the electrostatic induction power generator 100 can be increased as compared with the case of providing a single collector.

According to the first embodiment, as hereinabove described, the fixed substrate 11 and the fixed substrate 21 are mounted on the column portion 41, and the movable substrate 31 is mounted on the column portion 41 through the spring portions 42, whereby prescribed intervals between the movable substrate 31 and the fixed substrates 11 and 21 can be held.

Second Embodiment

Figure 8:
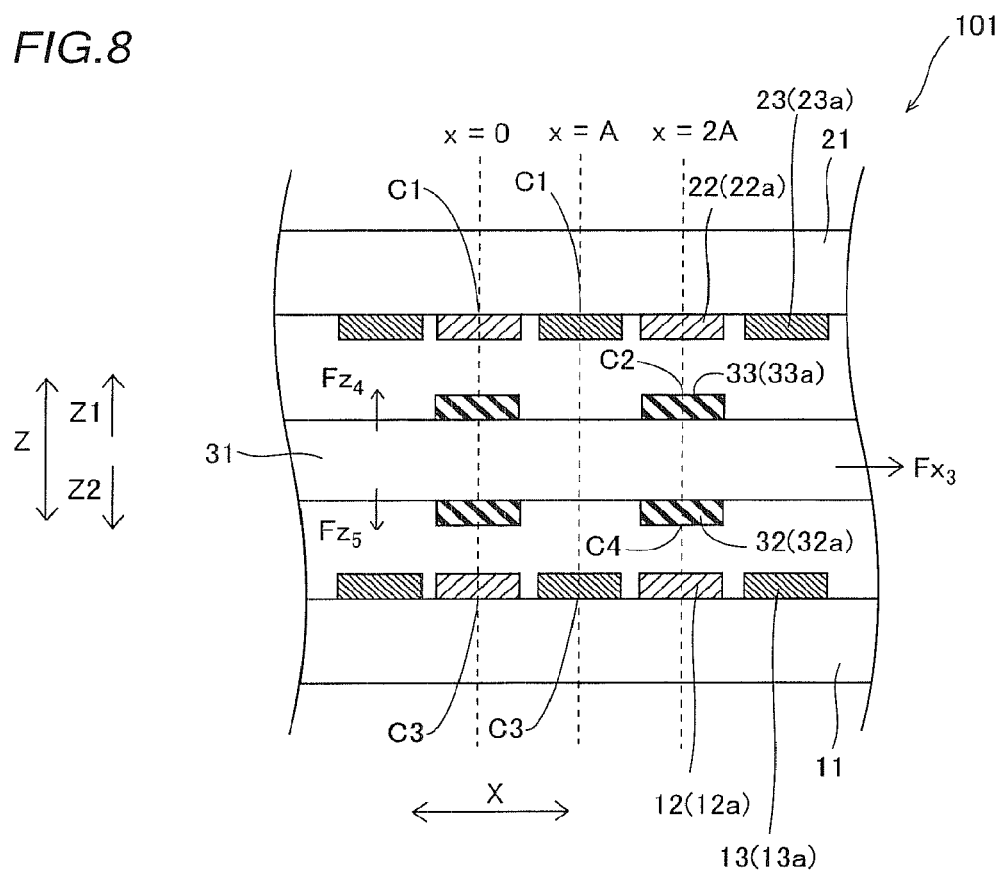
FIG. 8 is an enlarged sectional view of an electrostatic induction power generator according to a second embodiment of the present invention.

In an electrostatic induction power generator 101 according to a second embodiment, an electret film 32 and an electret film 33 are so arranged as to overlap with each other in plan view, and centers C3 in a width direction of teeth 12a forming an interdigital collector 12 and centers C4 in a width direction of teeth 32a forming the interdigital electret film 32 are so formed as to coincide with each other when centers C1 in a width direction of teeth 22a forming an interdigital collector 22 and centers C2 in a width direction of teeth 33a forming the interdigital electret film 33 coincide with each other as shown in FIG. 8, dissimilarly to the aforementioned first embodiment. In other words, the electret film 33 and the electret film 32 are so formed as to be opposed to the collector 22 (collector 23) and the collector 12 (collector 13) respectively in a state where the centers C2 in a direction X of the teeth 33a forming the interdigital electret film 33 and the centers C4 in the direction X of the teeth 32a forming the interdigital electret film 32 coincide with each other. The remaining structure of the second embodiment is similar to that of the aforementioned first embodiment.

Force for driving the electrostatic induction power generator 101 according to the second embodiment of the present invention will be described with reference to FIGS. 8 and 9.

In the electrostatic induction power generator 101, when electrostatic force acts between the collector 22 (collector 23) and the electret film 33, force $Fz_4$ attracting to a side of a fixed substrate 21 (along arrow Z1) acts on a movable substrate 31, as shown in FIG. 8. When electrostatic force acts between the collector 12 (collector 13) and the electret film 32, force $Fz_5$ attracting to a side of a fixed substrate 11 (along arrow Z2) acts on the movable substrate 31. The electrostatic force $Fz_4$ and $Fz_5$ are reversed in direction in which force acts, and absolute values of the magnitude of the force are substantially equal to each other. Dissimilarly to the aforementioned first embodiment, the centers C3 in the width direction of the teeth 12a forming the interdigital collector 12 and the centers C4 in the width direction of the teeth 32a forming the interdigital electret film 32 coincide with each other, when the centers C1 in the width direction of the teeth 22a forming the interdigital collector 22 and the centers C2 in the width direction of the teeth 33a forming the interdigital electret film 33 coincide with each other, and hence the electrostatic force $Fz_4$ and $Fz_5$ acting on the movable substrate 31 are further canceled as compared with the aforementioned first embodiment. Consequently, when the movable substrate 31 moves in the direction X, frictional force ($\mu Fz$) reaches substantially zero and the quantity of power generated in the electrostatic induction power generator 101 is inhibited from reduction.

Figure 9:
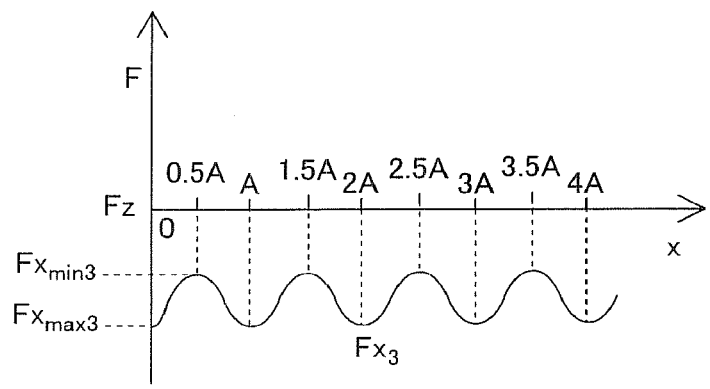
FIG. 9 is a diagram for illustrating power for driving the electrostatic induction power generator according to the second embodiment of the present invention.

Assuming that $Fx_3$ represents force (force moving the movable substrate 31) in the direction X necessary for causing electrostatic induction in the collectors 12, 13, 22 and 23, $Fx_3$ reaches a maximum value $Fx_{max3}$ as an absolute value as shown in FIG. 9 when the centers C1 in the width direction of the teeth 22a (teeth 23a) forming the interdigital collector 22 (collector 23) and the centers C2 in the width direction of the teeth 33a forming the interdigital electret film 33 coincide with each other (when x=0, A, 2A shown in FIG. 8).

On the other hand, when the centers C1 in the width direction of the teeth 22a and 23a forming the interdigital collectors 22 and 23 and the centers C2 in the width direction of the teeth 33a forming the interdigital electret film 33 do not coincide with each other, the magnitude of $Fx_3$ is smaller than the maximum value $Fx_{max3}$ and reaches a minimum value $Fx_{min3}$ as an absolute value on positions of x=0.5 A, 1.5 A, 2.5 A . . . shown in FIG. 9.

Difference between the maximum value $Fx_{max3}$ and the minimum value $Fx_{min3}$ of the force moving the movable substrate 31 according to the second embodiment is larger than the difference between the maximum value $Fx_{max2}$ and the minimum value $Fx_{min2}$ according to the aforementioned first embodiment. Thus, stability of an operation of the electrostatic induction power generator 101 is lower than that of the electrostatic induction power generator 100 according to the first embodiment, while the stability of the operation is higher than that of the electrostatic induction power generator 400 according to the comparative example (see FIG. 6).

The remaining effects of the second embodiment are similar to those of the aforementioned first embodiment.

Third Embodiment

In an electrostatic induction power generator 102 according to a third embodiment, a single collector 12 and a single collector 22 are formed on surfaces of a fixed substrates 11 and 21 respectively, dissimilarly to the aforementioned first and second embodiments.

Figure 10:
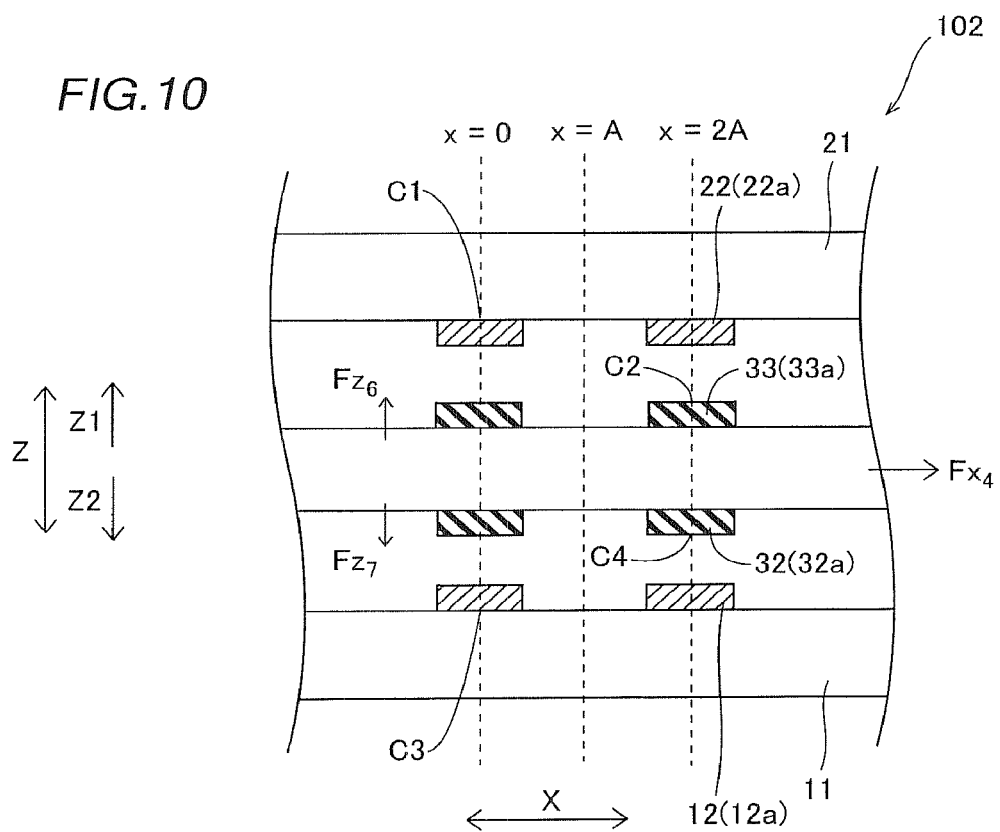
FIG. 10 is an enlarged sectional view of an electrostatic induction power generator according to a third embodiment of the present invention.

In the electrostatic induction power generator 102, the single collector 12 and the single collector 22 are formed on the surfaces of fixed substrates 11 and 21 respectively as shown in FIG. 10, and no collectors 13 and 23 are formed unlikely to the aforementioned first and second embodiments. Centers C3 in a width direction of teeth 12a forming the interdigital collector 12 and centers C4 in a width direction of teeth 32a forming an interdigital electret film 32 are so formed as to coincide with each other when centers C1 in a width direction of teeth 22a forming the interdigital collector 22 and centers C2 in a width direction of teeth 33a forming an interdigital electret film 33 coincide with each other. The remaining structure of the third embodiment is similar to that of the aforementioned first and second embodiments.

Force for driving the electrostatic induction power generator 102 according to the third embodiment of the present invention will be described with reference to FIGS. 10 and 11.

In the electrostatic induction power generator 102 according to the third embodiment, when electrostatic force acts between the collector 22 and the electret film 33, force $Fz_6$ attracting to a side of a fixed substrate 21 (along arrow Z1) acts on a movable substrate 31, as shown in FIG. 10. When electrostatic force acts between the collector 12 and the electret film 32, force $Fz_7$ attracting to a side of a fixed substrate 11 (along arrow Z2) acts on the movable substrate 31. The electrostatic force $Fz_6$ and $Fz_7$ are reversed in direction in which force acts, and absolute values of the magnitude of the force are substantially equal to each other. Similarly to the aforementioned second embodiment, the centers C3 in the width direction of the teeth 12a forming the interdigital collector 12 and the centers C4 in the width direction of the teeth 32a forming the interdigital electret film 32 coincide with each other, when the centers C1 in the width direction of the teeth 22a forming the interdigital collector 22 and the centers C2 in the width direction of the teeth 33a forming the interdigital electret film 33 coincide with each other, and hence the electrostatic force $Fz_6$ and $Fz_7$ acting on the movable substrate 31 are further canceled as compared with the aforementioned first embodiment. Consequently, when the movable substrate 31 moves in the direction X, frictional force ($\mu Fz$) reaches substantially zero and the quantity of power generated in the electrostatic induction power generator 101 is inhibited from reduction.

Figure 11:
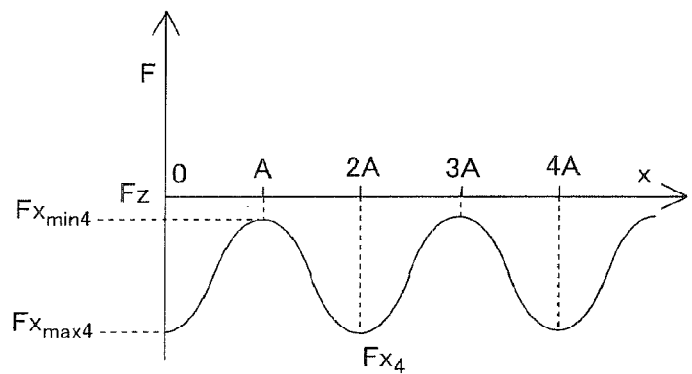
FIG. 11 is a diagram for illustrating power for driving the electrostatic induction power generator according to the third embodiment of the present invention.

Assuming that $Fx_4$ represents force (force moving the movable substrate 31) in the direction X necessary for causing electrostatic induction in the collectors 12 and 22, $Fx_4$ reaches a maximum value $Fx_{max4}$ as an absolute value as shown in FIG. 11 when the centers C1 in the width direction of the teeth 22a forming the interdigital collector 22 and the centers C2 in the width direction of the teeth 33a forming the interdigital electret film 33 coincide with each other (when x=0, 2A shown in FIG. 10).

As shown in FIG. 11, on the other hand, when the centers C1 in the width direction of the teeth 22a forming the interdigital collector 22 and the centers C2 in the width direction of the teeth 32a forming the interdigital electret film 32 do not coincide with each other, the magnitude of $Fx_4$ is smaller than the maximum value $Fx_{max4}$ and reaches a minimum value $Fx_{min4}$ as an absolute value on positions of x=A, 3A ... shown in FIG. 11.

Difference between the maximum value $Fx_{max4}$ and the minimum value $Fx_{min4}$ of the force moving the movable substrate 31 according to the third embodiment is larger than the difference between the maximum value $Fx_{max3}$ and the minimum value $Fx_{min3}$ according to the aforementioned second embodiment. Thus, stability of an operation of the electrostatic induction power generator 102 is lower than that of the electrostatic induction power generator 101 according to the second embodiment. However, the quantity of power can be inhibited from reduction as compared with the electrostatic induction power generator 400 according to the aforementioned comparative example (see FIG. 6) since no force in a direction Z acts on the movable substrate 31.

Although the present invention has been described and illustrated in detail, it is clearly understood that the same is by way of illustration and example only and is not to be taken by way of limitation, the spirit and scope of the present invention being limited only by the terms of the appended claims.

For example, while the electrostatic induction power generator are constituted by the collectors and the electret films in each of the aforementioned embodiments, the present invention is not restricted to this but the electrostatic induction power generator may be constituted by collectors and electrodes fixed at a prescribed potential.

While the collectors are formed on the surfaces of the fixed substrates and the electret films are formed on the both surfaces of the movable substrate in each of the aforementioned embodiments, the present invention is not restricted to this but the electret films may be formed on the surface of the fixed substrates and the collectors may be formed on the both surfaces of the movable substrate.

While the electret films are formed on the both surfaces of the movable substrate in each of the aforementioned embodiments, the present invention is not restricted to this but an electret film may be formed on one of the surfaces of the movable substrate and a collector may be formed on the other surface. An electret film is formed on the surface of the fixed substrate on a side opposed to the collector on the movable substrate.

Figure 12:
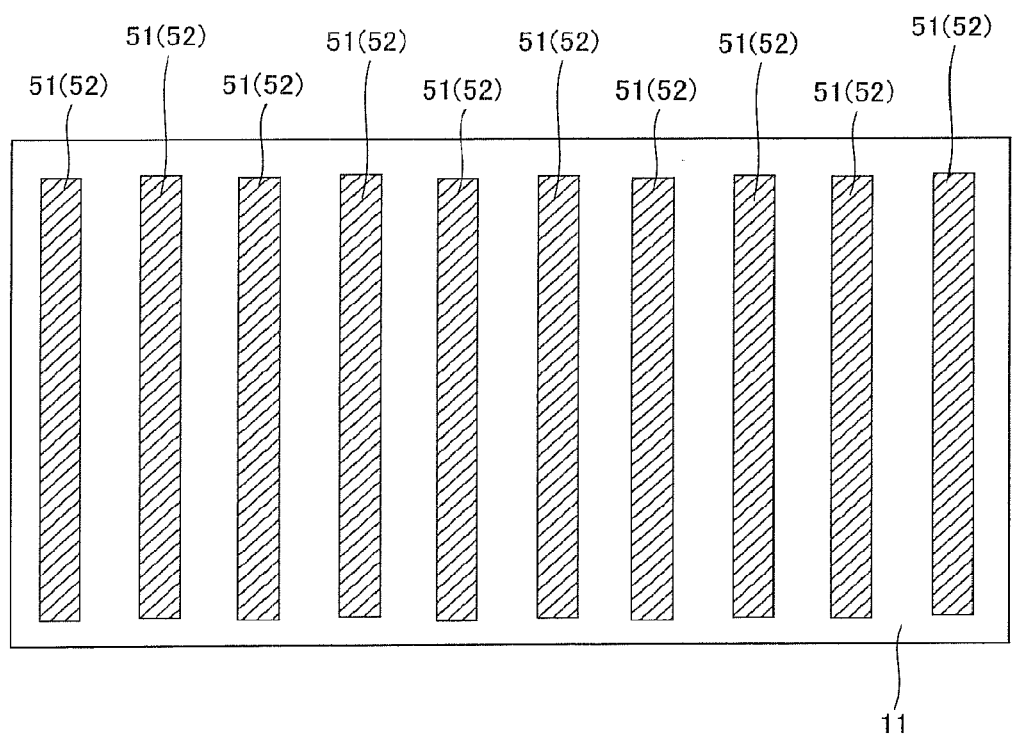
FIG. 12 is a plan view of a collector (electret film) according to a modification of each of the first to third embodiments of the present invention.

While the interdigital movable electrodes (electret films) are formed in each of the aforementioned embodiments, the present invention is not restricted to this but oblong collectors 51 (electret films 52) may be formed as shown in FIG. 12.

While the interval L6 between the collectors 12 and 13 and the electret film 32 and the interval L7 between the collectors 22 and 23 and the electret film 33 are equal to each other in each of the aforementioned embodiments, the present invention is not restricted to this. In the present invention, the interval L6 between the collectors 12 and 13 and the electret film 32 and the interval L7 between the collectors 22 and 23 and the electret film 33 may be different from each other so as to cancel the electrostatic force between the collectors 12 and 13 and the electret film 32 and the electrostatic force between the collectors 22 and 23 and the electret film 33.

What is claimed is:

1. An electrostatic induction power generator comprising:

first and second substrates arranged to be opposed to each other;

a third substrate arranged between said first and second substrates to be opposed to said first and second substrates;

first and second electrodes provided on both surfaces of said third substrate respectively;

a third electrode provided on a surface of said first substrate; and a fourth electrode provided on a surface of said second substrate, wherein power is generated by electrostatic induction caused by relative movement of said first and second substrates and said third substrate.

2. The electrostatic induction power generator according to claim 1, wherein one of said first electrode and said third electrode is formed by an electret film and the other of said first electrode and said third electrode is formed by a collector, while one of said second electrode and said fourth electrode is formed by an electret film and the other of said second electrode and said fourth electrode is formed by a collector.

3. The electrostatic induction power generator according to claim 2, wherein
said second electrode and said fourth electrode are formed to be opposed to each other in a state where said first electrode and said third electrode are opposed to each other.

4. The electrostatic induction power generator according to claim 2, wherein
said first electrode, said second electrode, said third electrode and said fourth electrode are formed in interdigital or oblong shapes, and are formed by pluralities of electrode portions electrically connected to each other, respectively and
an average pitch of said electrode portions of each of said third and fourth electrodes is smaller than an average pitch of said electrode portions of each of said first and second electrodes.

5. The electrostatic induction power generator according to claim 4, wherein
the average pitch of said electrode portions of each of said third and fourth electrodes is about ½ of the average pitch of said electrode portions of each of said first and second electrodes.

6. The electrostatic induction power generator according to claim 4, wherein
said electrode portions of said second electrode are arranged to be formed over said electrode portions of said fourth electrode in plan view in a state where centers of said electrode portions of said first electrode in a width direction and centers of said electrode portions of said third electrode in a width direction coincide with each other in plan view.

7. The electrostatic induction power generator according to claim 6, wherein
centers of said electrode portions of said second electrode in a width direction are arranged in the vicinity of central portions of clearances between said electrode portions of said fourth electrode in plan view in the state where the centers of said electrode portions of said first electrode in the width direction and the centers of said electrode portions of said third electrode in the width direction coincide with each other in plan view.

8. The electrostatic induction power generator according to claim 7, wherein
pairs of said interdigital or oblong third and fourth electrodes formed by said pluralities of electrode portions are provided, and the centers of said electrode portions of said second electrode in the width direction are arranged in the vicinity of the central portions of the clearances between said electrode portions of said fourth electrode in plan view in the state where the centers of said electrode portions of said first electrode in the width direction and the centers of said electrode portions of one of said pair of third electrodes in the width direction coincide with each other in plan view.

9. The electrostatic induction power generator according to claim 4, wherein
pairs of said interdigital or oblong third and fourth electrodes formed by said pluralities of electrode portions are provided, and centers of said electrode portions of said second electrode in a width direction and centers of said electrode portions of one of said pair of fourth electrodes in a width direction substantially coincide with each other in plan view in a state where centers of said electrode portions of said first electrode in a width direction and centers of said electrode portions of one of said pair of third electrodes in a width direction coincide with each other in plan view.

10. The electrostatic induction power generator according to claim 4, wherein
said interdigital or oblong third and fourth electrodes formed by said pluralities of electrode portions are formed one by one, and
centers of said electrode portions of said second electrode in a width direction and centers of said electrode portions of said fourth electrode in a width direction substantially coincide with each other in plan view in a state where centers of said electrode portions of said first electrode in a width direction and centers of said electrode portions of said third electrode in a width direction coincide with each other in plan view.

11. The electrostatic induction power generator according to claim 4, wherein
said first electrode and said second electrode are formed to be opposed to said third electrode and said fourth electrode respectively in a state where centers of said electrode portions of the said first electrode in a width direction and centers of said electrode portions of the said second electrode in a width direction are deviated from each other.

12. The electrostatic induction power generator according to claim 4, wherein
said first electrode and said second electrode are formed to be opposed to said third electrode and said fourth electrode respectively in a state where centers of said electrode portions of the said first electrode in a width direction and centers of said electrode portions of the said second electrode in a width direction substantially coincide with each other.

13. The electrostatic induction power generator according to claim 4, wherein
widths of said electrode portions of said first electrode, said second electrode, said third electrode and said fourth electrode are substantially equal to each other.

14. The electrostatic induction power generator according to claim 1, wherein
an interval between said first electrode and said third electrode and an interval between said second electrode and said fourth electrode are so determined that electrostatic force acting between said first electrode and said third electrode and electrostatic force acting between said second electrode and said fourth electrode are canceled.

15. The electrostatic induction power generator according to claim 14, wherein
the interval between said first electrode and said third electrode and the interval between said second electrode and said fourth electrode are substantially equal to each other.

16. The electrostatic induction power generator according to claim 2, wherein
said first electrode and said second electrode are formed by electret films and said third electrode and said fourth electrode are formed by collectors.

17. The electrostatic induction power generator according to claim 2, wherein
charges of the same polarity are injected into one of said first electrode and said third electrode and one of said second electrode and said fourth electrode.

18. The electrostatic induction power generator according to claim 1, further comprising a first rectifier circuit connected to said third electrode and a second rectifier circuit connected to said fourth electrode.

19. The electrostatic induction power generator according to claim 18, wherein each of said third electrode and said fourth electrode is formed in an interdigital or oblong shape and is formed by a plurality of electrode portions electrically connected to each other, and pairs of said interdigital or oblong third and fourth electrodes formed by said pluralities of electrode portions are provided, and said first rectifier circuit is connected to said pair of third electrodes and said second rectifier circuit is connected to said pair of fourth electrodes.

20. The electrostatic induction power generator according to claim 1, wherein said first and second substrates are mounted on a column portion, and said third substrate is mounted on said column portion through a spring portion.

* * * * *